United States Patent [19]

Andersson

[11] Patent Number: 5,692,702

[45] Date of Patent: Dec. 2, 1997

[54] ACTIVE CONTROL OF TONE NOISE IN ENGINE DUCTS

[75] Inventor: Anders O. Andersson, Seattle, Wash.

[73] Assignee: The Boeing Company, Seattle, Wash.

[21] Appl. No.: 641,293

[22] Filed: Apr. 30, 1996

Related U.S. Application Data

[63] Continuation of Ser. No. 282,391, Jul. 28, 1994, abandoned.

[51] Int. Cl.⁶ ........................................ F01D 25/04
[52] U.S. Cl. ..................... 244/1 N; 415/119; 101/206; 381/71
[58] Field of Search ..................... 381/165, 64, 71; 244/1 N; 415/118, 119; 181/206

[56] References Cited

U.S. PATENT DOCUMENTS

| | | |
|---|---|---|
| 3,693,749 | 9/1972 | Motsinger et al. . |
| 4,044,203 | 8/1977 | Swinbanks . |
| 4,156,344 | 5/1979 | Cuthbertson et al. ............... 415/119 |
| 4,199,295 | 4/1980 | Raffy et al. . |
| 4,255,083 | 3/1981 | Andre et al. ........................... 415/119 |
| 4,715,559 | 12/1987 | Fuller . |
| 4,934,483 | 6/1990 | Kallergis . |
| 5,025,888 | 6/1991 | Areas et al. ............................. 244/1 N |
| 5,119,902 | 6/1992 | Geddes . |
| 5,141,391 | 8/1992 | Acton et al. ............................. 415/119 |
| 5,157,596 | 10/1992 | Alcone . |
| 5,221,185 | 6/1993 | Pla et al. . |
| 5,340,271 | 8/1994 | Freeman ................................ 415/119 |
| 5,386,689 | 2/1995 | Bozich et al. ......................... 415/119 |
| 5,478,199 | 12/1995 | Gliebe .................................... 415/119 |
| 5,498,127 | 3/1996 | Kraft et al. ............................. 415/119 |

FOREIGN PATENT DOCUMENTS 1291943  10/1972  United Kingdom ............... 415/119

Primary Examiner—Galen I. Barefoot
Attorney, Agent, or Firm—Conrad O. Gardner

[57] ABSTRACT

The application of active noise control to influence the fan-noise components in engine ducts. The fan is used as a source of counter noise by introducing flow distortions upstream or downstream of the fan. Microphone arrays sense the noise and produce a control output signal for controlling a distortion producer. The control output signal for the distortion producer comes from a control algorithm utilizing the output of the microphone signals sampled at a defined rate based on the fan blade passing frequency.

12 Claims, 3 Drawing Sheets

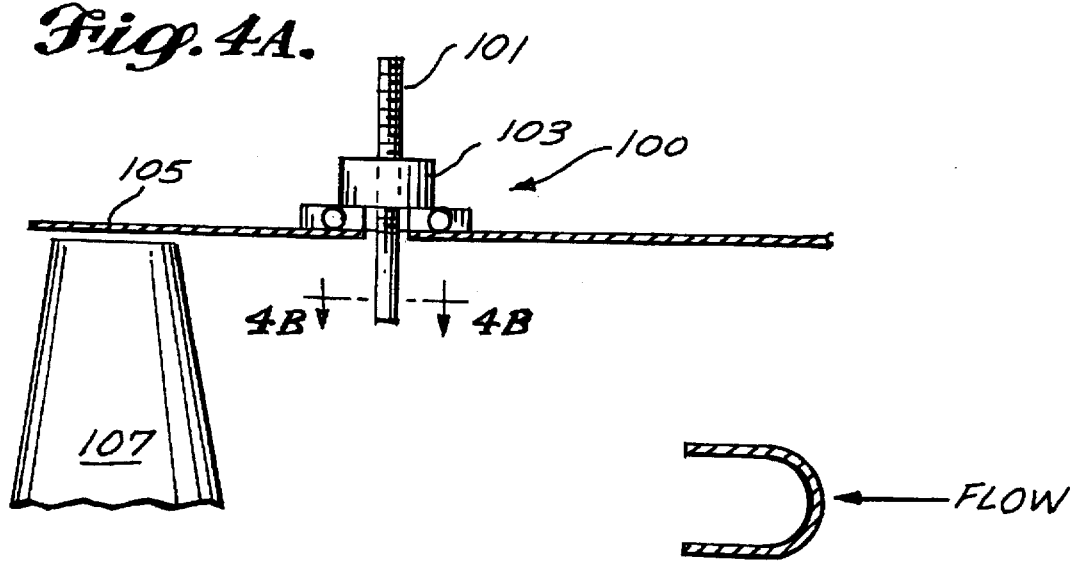
*Fig. 4A.*
*Fig. 4B.*
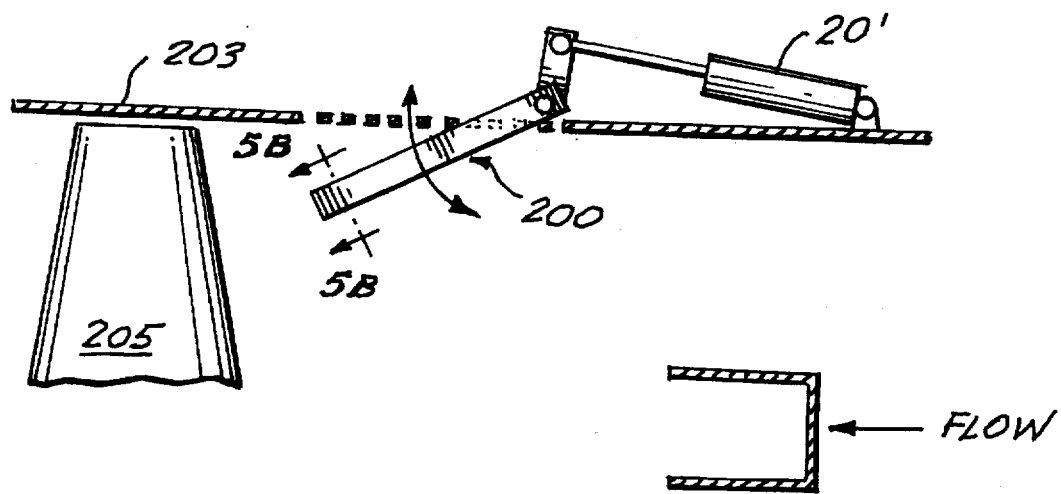
*Fig. 5A.*
*Fig. 5B.*

ACTIVE CONTROL OF TONE NOISE IN ENGINE DUCTS

This application is a continuation of prior application Ser. No. 08/282,391, filed Jul. 28, 1994 now abandoned.

FIELD OF THE INVENTION

This invention relates to noise reduction of aircraft engines and more particularly to apparatus and methods for minimizing engine fan noise.

BACKGROUND OF THE INVENTION

Prior efforts at noise control have included:

U.S. Pat. No. 4,044,203 to Swinbanks which pertains to active control of sound waves. Referring to FIG. 10, the system is employed in the reduction of noise in aircraft jet engines. Referring to column 11, line 57—column 12, line 52, an inlet of 10 of a jet engine has an array of sound sources 11, 11a, 11b, each including three loudspeakers, spaced equally around the circular cross-section of the air inlet. A similar array of sound detectors 12, 12a, 12b consisting of micro phones arranged similarly to the loudspeakers is located adjacent to the compressor 13. The outputs of the detectors 12, 12a, 12b are amplified, delayed and used to drive sources 11, 11a, 11b. The noise arising from the rear end of the engine contains a substantially higher proportion of longitudinally propagated sound waves, and therefore the rear of the engine has an array of three sound sources 14, 14a, 14b consisting of loudspeakers. A similar array of sound detectors 15, 15a, 15b are located upstream of the source array and consist of microphones arranged in the same configuration. The sound waves are attenuated by generating sound waves from the array of sound sources. Each source generates two waves traveling in opposite directions, those traveling in the same direction as the unwanted wave sum to give a resultant which interferes destructively with the unwanted wave, while those traveling in the opposite direction sum to give a negligible resultant.

U.S. Pat. No. 5,119,902 to Geddes which shows an active muffler transducer arrangement for use in motor vehicles. The apparatus includes an electronic control which is responsive to a signal generated by a sensor for producing a drive signal delivered to a transducer which emits cancellation pulses through a conduit, where both front and rear sides of the transducer are acoustically coupled to the conduit to improve the efficiency of the transducer. The system employs a speaker which is enclosed with a chamber, including a port acoustically coupled to the conduit to cancel sound pressure pulses in the conduit.

U.S. Pat. No. 5,221,185 to Pla, et al which pertains to a method and apparatus for synchronizing rotating machinery to reduce noise. The patent contemplates the use of the device in airplane engines and turbofans in multi-engine aircraft. Referring to FIG. 1, a shaft speed control loop utilizes two tachometers 14 and 16, which are attached to respective shafts of two engines 10 and 12, respectively, to monitor the shaft speeds. Signals from the tachometers are sent to a controller 18, which produces shaft speed errors signals by subtracting the shaft speed signal of the slave engine tachometer from the shaft speed signal of the master engine tachometer. The system includes one or more feedback sensors, such as microphones or other transducers, which are situated to sense the noise level. The sensor or microphone 20 produces a signal representing the sensed noise level. This signal is sent to a sample and hold circuit 22. The controller generates an output signal in response to the inputs from the microphones and the tachometers, which is fed to the engines to create desired phase relationships, thereby canceling noise.

U.S. Pat. No. 5,157,596 to Alcone relates to adaptive noise cancellation in a closed loop control system. The system reduces undesired noise in a closed loop control system by injecting an adaptively constructed noise cancellation signal.

U.S. Pat. No. 4,715,559 to Fuller which relates to an apparatus and method for global noise reduction for attenuating sound radiated from the vibrating surface into a control volume. An actuator or shaker is provided and is directly connected to the vibrating surface, thus, inducing a canceling sound into the control volume which is combined with the attenuating and radiated sound. A sensor is also located within the control volume to detect the resultant sound of the combination of the canceling and radiated sound thereby producing error signal. A controller, namely a computer including a minimization algorithm, is responsive to the error signal to modify the phase and amplitude of the control signal to further attenuate the sound.

U.S. Pat. No. 3,693,749 to Motsinger, et al which relates to the reduction of gas turbine engine noise annoyance by modulation. The sound energy is modulated by imposing on it a higher frequency sound source, which interacts with the sound energy from the gas turbine engine so that the original tones disappear and two new tones appear. The new tones are at frequencies which occur at the sum and at the difference of the frequencies of the original tones.

U.S. Pat. No. 4,199,295 to Raffy, et al which shows a method and device for reducing the noise of turbo machines by producing counter-noise of opposed phase. Jets of fluid are injected under pressure through orifices borne by the rotor located near to the periphery of the blades, and the flow of the fluid is modulated at a frequency which is a whole number multiple of the rotational frequency of the rotor shaft. Regulation of the phase of the modulated injected fluid is carried out in such a manner that the acoustic waves generated by the injected fluid are substantially in opposition, with respect to phase, to those of the noise to be reduced.

Engine fan noise due to increased fan diameter requires development of noise reduction technology suitable for reducing lower frequency noise affecting cabin interior noise and lowering local airport noise levels.

It is accordingly an object of the present invention to provide for reducing fan noise.

It is a further object of the present invention to provide a method and apparatus for reducing the tone component of fan noise.

SUMMARY OF THE INVENTION

As fan noise is composed of both broadband and tone components, the present invention relates to the application of active noise control to influence the tone component. It further relates to means for reducing the broadband component. The fan itself is used as a source of counter noise by introducing flow distortions upstream or downstream of the fan. Since flow distortions are the main cause of the primary noise, the present system utilizes noise sources of similar strength generated with artificial distortions. A wake producer is located in a circular array forward of the fan or a potential-flow distortion producer is located in a circumferential array aft of the fan. Adjacent to the wake producer, microphone arrays provide sensing for the control system. The control output signal for the wake producer actuation is derived from a control algorithm whose input is the microphone signals sampled at a defined rate based on fan blade passing frequency (BPF). In the present control system, tone noise microphone signals are decomposed into the amplitudes of the circumferential modes for the BPF and its harmonics. The control algorithm output continuously adjusts the wake producer to minimize mode amplitudes.

BRIEF DESCRIPTION OF THE DRAWINGS

Various aspects and features of the invention are described hereinafter taken in conjunction with the drawings wherein:

FIG. 4A is a diagram showing a variable-immersion rod as wake producer in the present system while FIG. 4B is a section taken along lines 4B—4B; and, FIG. 5A is illustrative of a hinged mechanical wake producer for use in the present system while FIG. 5B is a section taken along lines 5B—5B.

DETAILED DESCRIPTION OF THE INVENTION

The present invention utilizes the fan itself as a counter-noise source by introducing flow distortions with which the fan interacts. Since flow distortions are the main cause of the primary noise, noise sources of similar strength are generated with artificial distortions. Devices producing controlled inlet distortions would cause angle-of-attack changes on the rotor blades, which in turn would cause controlled generation of counter noise in particular circumferential mode patterns.

Two methods for pro during the distortions are shown for use in the present system. The devices are mounted in a circumferential array on the wall and consist of either 1) nozzles exhausting or ingesting actively controlled amounts of air or 2) rods with actively controlled protrusion into the flow.

Figure 1:
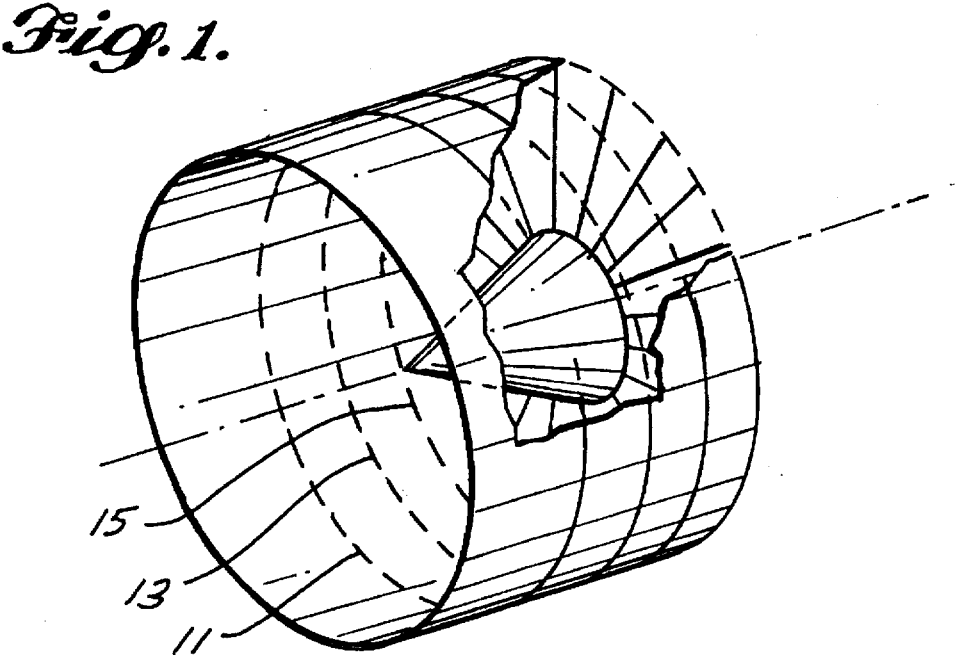
FIG. 1 is diagram in perspective of an exemplary arrangement of sensors and control devices in an engine inlet upstream of the fan.

The tone-noise control is based on wall-mounted microphone arrays in the inlet or the fan duct and only address tone noise at blade-passing frequency (BPF) and its higher harmonics. The arrangement of sensor arrays 11 and 13 and actuator array 15 is illustrated in FIG. 1.

The control proceeds as follows: The microphone signals are decomposed into the amplitudes of the circumferential modes at the wall for BPF and its harmonics using known signal processing methodology. The control algorithm adjusts the counter-noise devices so as to minimize the mode amplitudes. For this purpose transfer functions are used between device actuation and modal sound-amplitudes previously measured and stored by the system. The residual measured mode amplitudes are again used for controlling the counter-noise devices, the control principle being detailed in the appendix included hereinafter.

The use of more than one sensor array is considered. The reason for this is that each circumferential mode is made up of a number of radial modes which contribute in differing amounts to the wall pressure at different axial stations. By minimizing the wall pressure at several stations in a least-squares sense it would be possible to control more than one radial mode per circumferential mode.

Figure 2:
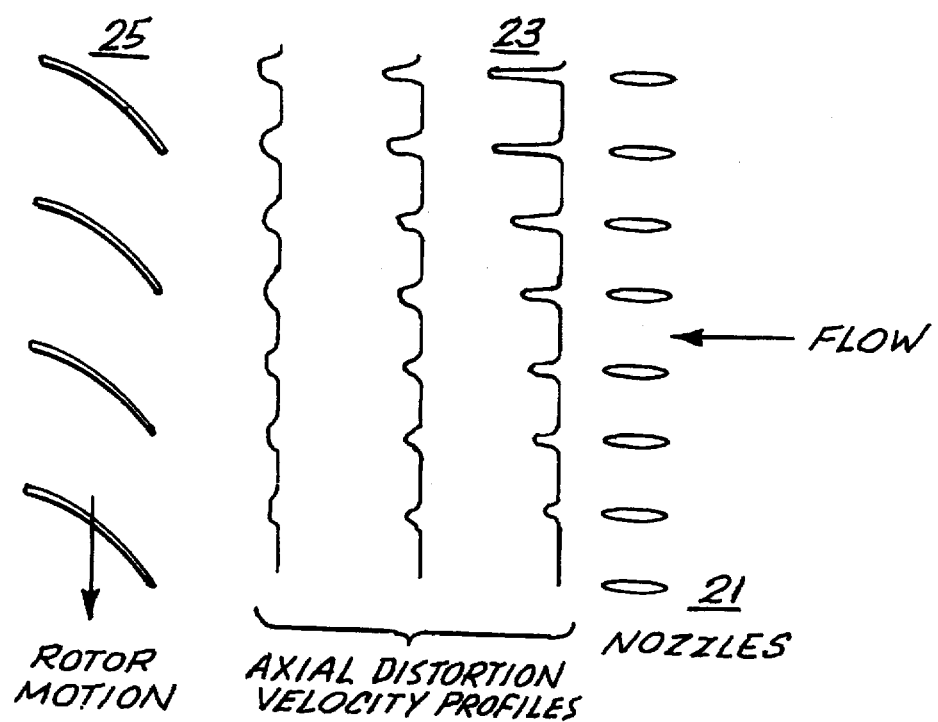
FIG. 2 is a diagram illustrative of the introduction of flow distortions in a controllable pattern by bleed-air nozzles.

A challenge of the present active-noise control system is in designing a counter-noise source with sufficient amplitude and of sufficient circumferential uniformity not to produce additional, propagating modes. The requirement of not unduly increasing the broadband noise has to also be considered. The goal of the distortion-noise device is to introduce flow distortions in a controllable pattern as illustrated in FIG. 2. Flow nozzles 21, either blowing bleed air or sucking boundary-layer air, for creating the distortions 23 are shown here for providing the inflow to the rotor 25, but a similar pattern could be obtained with mechanical devices.

While mechanical devices in front of the fan would not be the preferred configuration due to safety considerations, such devices could well be used immediately down-stream of the rotating blade row. The distortions would in this case not be caused by wakes but rather by the potential flow around the devices.

Note that the mode-producing control signals are quasi static, i.e., the control is achieved by introducing a number of steady rods, either actual or aerodynamic, near the fan. In order for these to be counter-source distortions, their circumferential orientation, and hence the acoustic phase, must be continuously variable. This can be accomplished through selection of a number of devices at least twice the largest required circumferential mode number to be controlled. This would allow any mode with any phase to be generated without "aliasing", i.e., introduction of spurious modes.

Figure 3:
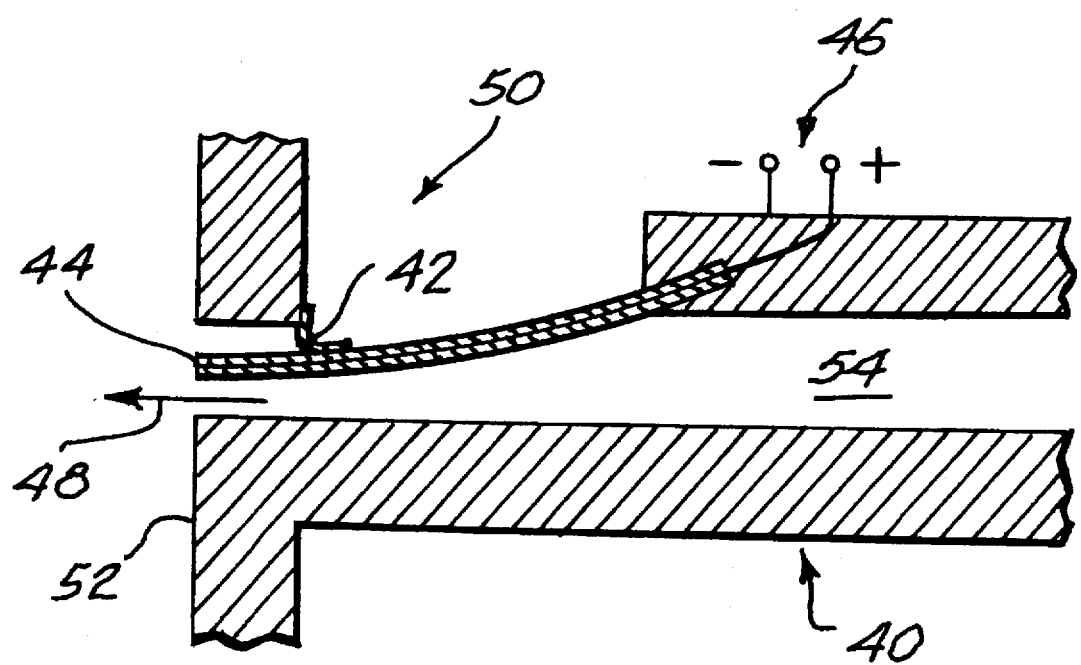
FIG. 3 is a cross sectional view of a piezoelectrically controlled nozzle for use in the present system.

The controllable nozzles present an interesting design question. Depending on required air flow several actuation principles are considered: piezoelectric, magnetostrictive, electrodynamic, pneumatic, hydraulic, and others. The choice is made on economic grounds once the flow requirements are met. Due to the quasi-static nature of the nozzle control, non-linearity of the material response results in the use of calibration tables. A piezoelectrically controlled nozzle is shown in FIG. 3. The seal and the two-sided pressurization of the piezo element have been introduced in order to minimize flow variations due to bleed-air pressure variations.

Piezoelectrically controlled nozzle 40 includes seal 42, duct wall 52, and bimorph piezobender 44. Positive and negative terminals for the control voltage are shown at 46. Nozzle flow is shown at 48, bleed air pressure at region 50 and 54, the bleed-air pressure ratio being greater than 2. Digitally controlled valves might also be used in the present system.

In the preferred configuration, where air nozzles are used to produce wakes, there is a risk that broadband-noise generation will be increased. Such an increase is counteracted by the fact that sound-absorbing linings, which are almost always employed in engine ducts, can be optimized for the broadband noise rather than be designed for a compromise between tone-noise and broadband-noise reduction.

A further way of reducing broadband-noise generation is the use of suction instead of blowing. In this case the boundary layer would be sucked off at the nozzles thereby modulating the boundary-layer thickness in a pattern similar to that of FIG. 2. Since the boundary-layer interacting with the rotor tips is a major broadband-noise generating mechanism, it is possible that the so modulated flow produces less broadband-noise than the unmodulated flow. If this is the case, general broadband noise reduction could be obtained through uniform suction around the engine circumference and tone-noise reduction through additional, modulated suction. The amount of uniform suction would be controlled through observation of the broadband-noise measured at the microphone arrays.

A variable-immersion rod 100 as wake producer is shown in FIG. 4A comprising threaded rod 101, rotating step-motor housing 103, inlet wall 105, and fan tip 107, where FIG. 4B is a sectional view taken along the lines 4B—4B of FIG. 4A illustrative of flow.

A further exemplary wake producer suitable for use on the present system is shown in FIG. 5A and wherein hinged mechanical wake producer 200 includes an actuator 201, the inlet wall 202 and fan tip 203 also shown while FIG. 5B is a cross sectional view taken along the lines 5B—5B of FIG. 5A.

Illustrative embodiments have been hereinabove disclosed with modifications thereof occurring to those skilled in the art. The scope of the invention is limited only by the claims following the Appendix.

APPENDIX

Active-noise-control algorithm for tones using circumferential mode-measurement arrays.
Modal amplitudes The circumferential-mode complex amplitudes are measured in the following manner with the engine running:

1. Sample the M microphones at a rate of e.g. 8 times the blade-passing frequency (BPF).
2. Accumulate such sampled data for a time period, say one second, for each microphone in order to average out effects of noise at other frequencies than BPF harmonics.
3. Perform a fast Fourier transform (FFT) on each microphone and store the complex amplitude for each harmonic of interest.
4. For each harmonic perform a complex digital Fourier transform (DFT) over the M microphones. This yields the desired complex modal amplitudes $$C_{hn} = \frac{2\pi}{M} \sum_{m=1}^{M} A_{hm} e^{in2\pi m/M} \quad n = -N \text{ to } N$$

where $C_{hn}$ is the complex amplitude of the nth mode at BPF harmonic h and $A_{hm}$ is the complex amplitude at BPF-harmonic h for microphone m.
Note that the modal amplitudes should be calculated for both positive and negative indices and that the number of microphones should be at least equal to the number of desired modes, typically more than twice the number of rotor blades (no distinction between modes $-M/2$ and $M/2$ can be made).
Transfer functions The control requires the transfer function (TF) between a given excitation of the actuators and the resulting modal amplitudes. The excitation amplitude is not given in terms of the individual actuator displacements but rather in terms of distortion-harmonic (DH) amplitudes. These amplitudes, which are complex, are defined as the DFT over the K actuator amplitudes. The TFs are determined as follows:

1. With the engine running measure the modal amplitudes with zero actuation.
2. Employ the actuators in the first DH sufficiently to make a substantial change in the microphone signals.
3. Measure the modal amplitudes again and record the difference from the zero-actuation case.
4. Calculate the TF as the modal-amplitude change divided by the DH amplitude. This calculation is done for each BPF harmonic.
5. Repeat steps 2–4 for each DH.

Control

The control proceeds as follows:

1. Measure the modal amplitudes.
2. Calculate the DH-amplitude changes necessary to minimize the modal amplitudes.

$$T_{hnk} dD_k = -C_{hn}$$

where $T_{hnk}$ is the transfer function between amplitude in mode n and exaltation amplitude in distortion harmonic k, $dD_k$ is the desired change in the amplitude of distortion-harmonic k, and $C_{hn}$ is the measured amplitude of mode n for BPF-harmonic h. This relation represents an overdetermined system of equations, if more than one mode-measurement array is used, and will be solved in a least-squares sense for all BPF harmonics simultaneously.

3. Apply the DH-amplitude changes.
4. Repeat steps 1–3 indefinitely.

Note that each distortion harmonic creates response in all BPF harmonics and therefore the minimization represents a compromise among the tone reductions. With a sufficiently large K (number of actuators) control of each tone can still be accomplished.

What is claimed:

1. A method for control of the fan-generated component of noise emanating from ducts of jet engines, comprising the steps of:
    a) providing devices for introducing flow distortions in the form of wakes;
    b) collecting sensor signals harmonically related to rotor blade-passing frequency for controlling the wake-producing devices; and,
    c) providing means for absorbing the broad-band sound generated by said wake-producing devices.

2. The method according to claim 1 wherein collecting said sensor signals comprises collecting through sampling at a multiple of the rotor blade passing frequency.

3. The method according to claim 1 wherein collecting said sensor signals comprises collecting inputs from at least one circumferential array of sensors.

4. The method according to claim 3 in which modal amplitudes of each circumferential mode at each blade-passing-frequency harmonic is utilized for control of the circumferential distortion of harmonics of said wake-producing devices.

5. A system for control of the fan generated component of noise emanating from ducts of jet engines, comprising in combination:
    a) a plurality of devices for introducing wakes to the fan;
    b) said control means responsive to a plurality of signals sampled at a predetermined rate related to the fan blade passing frequency; and,
    c) means for absorbing the broad-band sound generated by said wake-producing devices.

6. The system of claim 5 wherein said plurality of devices provide steady flow distortions in the inlet upstream of the fan.

7. The system of claim 5 wherein said plurality of devices provide steady flow distortions in the fan duct downstream of the fan.

8. The system of claim 5 wherein said plurality of devices comprise a number of nozzles around the inlet.

9. The system of claim 5 wherein said plurality of devices comprise a plurality of rods capable of variable immersion into the flow.

10. The system of claim 5 where said sound-absorbing means is the same device that provides the spatial flow distortions.

11. The system of claim 5 wherein the flow distortions are produced by suction.

12. The system of claim 11 wherein the average suction of all devices is determined by the broadband-noise component of the sensors.

* * * * *